June 6, 1933. J. C. GOOSMANN 1,912,444
METHOD OF PREPARING SOLIDIFIED CARBON DIOXIDE
Filed May 29, 1929
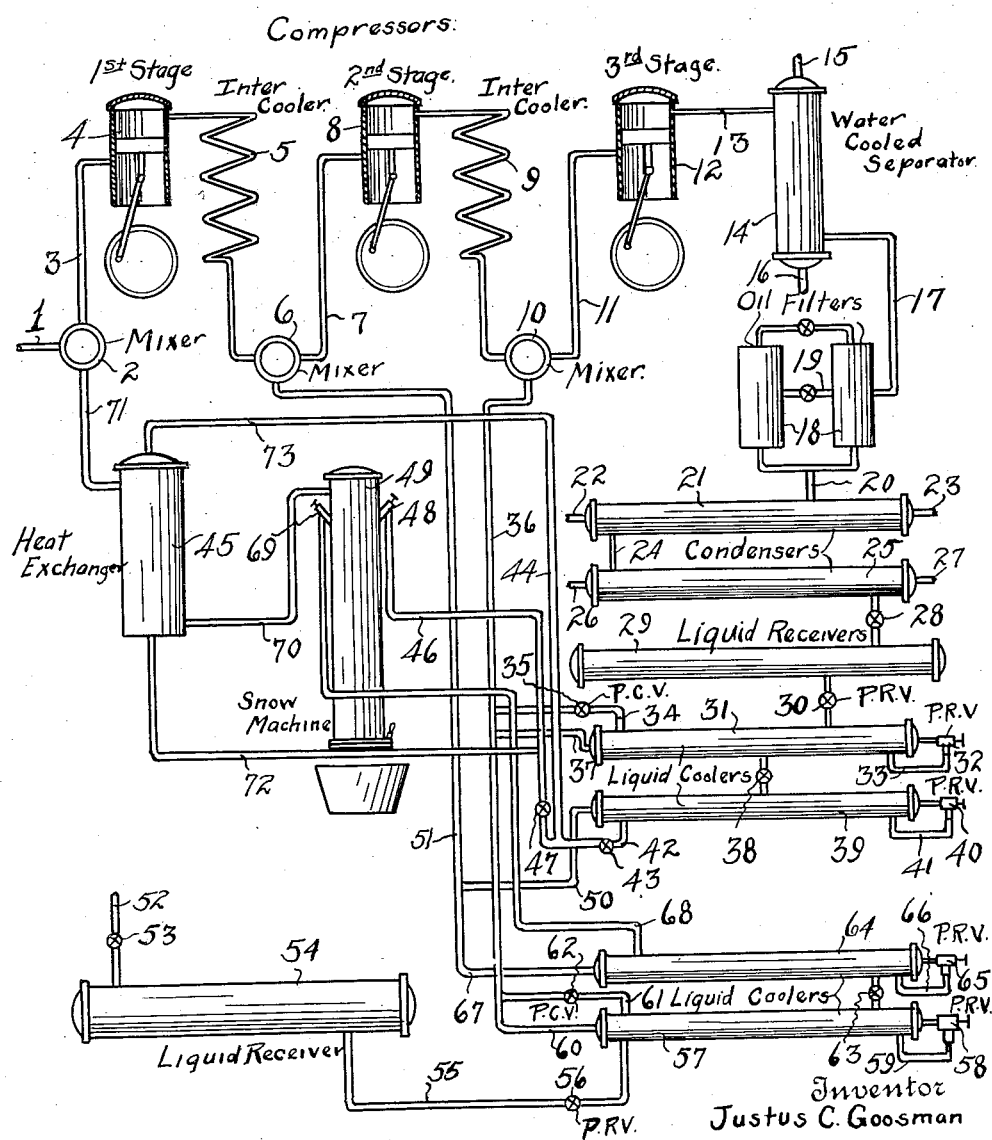

Patented June 6, 1933

1,912,444

UNITED STATES PATENT OFFICE

JUSTUS C. GOOSMANN, OF CHICAGO, ILLINOIS

METHOD OF PREPARING SOLIDIFIED CARBON DIOXIDE

Application filed May 29, 1929. Serial No. 366,911.

This invention relates in general to the production of carbon dioxide in solid form.

One of the objects of this invention is the provision of a method of producing solid carbon dioxide simultaneously from two sources of carbon dioxide, one delivering liquid carbon dioxide and the other gaseous carbon dioxide.

This invention relates in general to a novel and economical method of preparing liquefied gas, in particular liquid carbon dioxide for a prompt and simple conversion in state, that is, from liquid into a solidified condition.

It is the object of this invention to so prepare the liquefied medium for such change in state, that its conversion into a solid condition may be effected with the least sacrifice in work and temperature.

A further object of the invention consists in the method of conserving the power previously expended in the process of liquefaction to the highest possible extent during the subsequent cooling of the liquid.

A still further object of the invention resides in a novel method of heat exchange during liquid cooling so that heat dissipation and loss of energy is avoided as much as it is possible so to do in practice.

It is also the object of this invention to provide simple and effective means for cooling the liquid, after it leaves the condenser in which it previously had been liquefied, by internal as well as external evaporation, or by both, so that its temperature may closely approach its fusion or solidification temperature.

A further object comprises a method of sub-cooling the liquid below its corresponding pressure by means of cooling through a metallic wall and by recondensing the vapors previously released by pressure drop within a closed receptacle or liquid receiver.

A still further object of the invention consists in the return of the vapor spent in cooling the liquid without a greater loss in pressure than that which is necessary to drop its evaporating temperature for effectively cooling the liquid.

And still another object served by this invention is the freezing of water vapors in the cold liquid or upon the provided cooling surface to remove it from the liquid and prevent its flow with the liquid into the apparatus in which the conversion of the liquid into the solid condition takes place.

A still further object of this invention provides a method whereby liquid may be obtained from several sources at different liquid pressures, whereby the liquid of higher pressure is dropped to the pressure stage of the liquid of lower pressure, thereby cooling it by such pressure drop, and consequent evaporation of a portion of such liquid, recondensing such vapor by external evaporation or heat exchange through a metallic wall and subsequently cooling the entire bulk of the liquid either by pressure drop and consequent partial evaporation or by sub-cooling below its corresponding pressure, or by both means of cooling.

These and other objects are specifically pointed out in the following disclosure. They have already been explained in general and partly in detail in my copending applications, but they are herein more specifically explained, described and claimed.

That a liquefied gas, such as carbon dioxide, may be cooled by two well known methods, that is, by a pressure drop and simultaneous proportional evaporation whereby the balance of the liquid is cooled to a temperature corresponding with the reduced pressure; as well as by sub-cooling the liquid below its corresponding pressure, employing a cooling coil, evaporation of or circulation of a cooling medium through same, thereby absorbing the heat of the liquid through a metallic wall, as has been clearly stated in my copending application of August 11, 1928, having the Serial No. 298,992.

The return of the spent vapor used in cooling the liquid and the preservation of its pressure corresponding with the temperature in the respective liquid cooler, from which it is returned to the mixing cylinders interposed between the compression stages, is likewise pointed out in the above copending application.

Moreover, attention in this application is clearly directed to the economy achieved by means of this procedure, as well as to the fact that the cold vapor so returned from its respective liquid cooler in mixing with the warmer and superheated gas discharged into the corresponding mixing cylinder, reduces the temperature of the mixed gas and thereby provides a discharge temperature at the end of each compression at such reasonably low degree that harm to the compression machinery due to excessively high discharge temperature is effectively prevented.

The important feature of cooling the liquid by partial evaporation due to a drop in pressure, by sub-cooling it in a special liquid cooler below its corresponding pressure by heat transfer through a metallic wall, the employment of the cold vapors for the cooling of fresh warm gas flowing to the compressors in special mixing cylinders, and the preservation of the pressure in such cold vapors has been repeatedly pointed out in my copending application, filed October 24, 1928, Serial No. 314,644 and, more particularly, as far as the recondensation of some vapor generated on account of a drop in pressure is concerned, in my application filed January 18, 1929, Serial No. 333,508.

These and other objects, as they will appear from the following detailed disclosure, are herein more especially described and pointed out.

This invention resides substantially in the steps and combination of steps as will be described in greater detail hereinafter and set forth in the appended claims.

The single figure in the drawing shows diagrammatically, with some parts in cross-section, the apparatus by means of which the method in this invention is carried out.

The apparatus employed will be described in detail before taking up this operation. The pipe 1 is connected to any suitable source of carbon dioxide gas and delivers into the mixing cylinder 2. The cylinder is connected by pipe 3 to the intake port of the first stage compressor indicated at 4. The exhaust port of the compressor is connected to the intercooler 5. The other end of this intercooler is connected to the mixing cylinder 6 which, in turn, is connected by pipe 7 to the intake port of the compressor 8. The exhaust port of the compressor is connected to the intercooler pipe coil 9 which has its other end connected to the mixer 10. The intercoolers diagrammatically illustrated at 5 and 9 consist of pipe coils over which cold water is run, or which may be immersed in any suitable refrigerant. The mixer 10 is connected by pipe 11 to the intake port of compressor 12. The exhaust port of compressor 12 is connected by pipe 13 to the water cooler separator 14.

As disclosed in my above mentioned cases the water cooled separator consists of nothing more than a cylinder having a series of pipes running therethrough. Cold water, or other suitable refrigerating agent is flowed through the pipes by means of the inlet and outlet connections 15 and 16. The carbon dioxide delivered from compressor 12 circulates in the separator 14 around the cooling pipes. Pipe 13 delivers to the cylinder of the cooler around these pipes. Pipe 17 leads from the cylinder to the oil filters 18 and 19 which may be operated in parallel, or in series, by means of the connection 19. These oil filters are of any suitable or well known construction and serve to remove any oil taken up by the carbon dioxide during the compression operations.

The carbon dioxide coming from the oil filters flows through pipe 20 to the condenser 21 and through pipe 24 to the condenser 25. The condensers 21 and 25 comprise, like the separator, a cylinder having a series of pipes running therethrough through which a refrigerant may be flowed by means of the connections 22, 23 and 26, 27 respectively. The $CO_2$ delivered to the cylinders flows around the cold pipes. Condenser 25 delivers to the cylinder 29 of the liquid receiver through a connection having the control valve 28 therein. The receiver 29 is an ordinary closed cylinder in which the liquid is received. The liquid then flows to the liquid cooler 31 through a connection having the pressure connecting valve 30 therein. This valve, like the other pressure reducing valves to be described, may be one of the several well known types in which the pressure of a gas or liquid is reduced as it flows therethrough. The liquid in the cooler 31 flows around a number of pipes within the cylinder.

These liquid coolers are again similar in construction to the separator 14 and the condensers 21 and 25. The space with which the pipes are in communication, that is, connected to the space within the cylinder around the pipes through the connection 33 and the pressure reducing valve 32. At the other end of the cylinder the space connected to the pipes is connected by pipe 37 to pipe 36 which, in turn, is connected to the mixer 10. The space around the pipes is connected to pipe 36 through the connection 34 and the pressure control valve 35. This pressure control valve is of the same construction as the pressure reducing valve and is given a different name at this point because it acts a little differently as will be described later. Liquid cooler 31 is connected to liquid cooler 39 to the pressure reducing valve 38. As before, the space around the pipes is in communication with the space to which the pipes are connected by means of a connection 41 and pressure reducing valve 40. At the other end of the cylinder 39 the space in communication with the pipes is connected by pipe 50 to pipe 51 which, in turn, terminates in mixer 6.

Liquid carbon dioxide from any suitable source is delivered through pipe 52 and valve 53 to the liquid receiver 54. This receiver is a plain closed cylinder. A pipe 55 connects the receiver through the pressure reducing valve 56 to the liquid cooler 57. This cooler, as well as liquid cooler 64, is constructed the same as the coolers 31 and 39. As before, the space around the pipes is connected to the space to which the pipes are connected by the pipe connection 59 and pressure reducing valve 58.

At the other end of cylinder 57 the space to which the pipes are connected is, in turn, connected by pipe 60 to pipe 36. The space around the pipes is connected to pipe 36 through the connection 61 and the pressure control valve 62.

Liquid cooler 57 is connected to liquid cooler 64 through a connection having the valve 63 therein. The space around the pipes are connected to the space to which the pipes are connected through the connection 66 and pressure reducing valve 65. As before, at the other end of the cylinder the space with which the pipes are in connection is connected by pipe 67 to pipe 51. The space around the pipes is connected by pipe 68 to the discharge nozzle 69 of the snow forming or solidifying machine 49. Another nozzle 48 of the machine is connected by pipe 46 through valves 47 and 43 and pipe 42 to the space around the pipes in the liquid cooler 39. The space within the machine 49 is connected by pipe 70 to the heat exchanger 45. The heat exchanger is constructed internally like the water cooled separator, the condensers and the liquid coolers. The cooling pipes within the heat exchanger are connected at one end through pipe 72 to pipe 46; at their other ends these cooling pipes are connected by pipe 73 to pipe 46 between valves 47 and 43. The space around the cooling pipes is connected by pipe 71 to the mixer 2.

The operation of the device is somewhat as follows. The gas coming from the source through pipe 1 is at some nominal pressure while the liquid coming from its source through pipe 52 is at a pressure of about twelve hundred pounds per square inch and a temperature of 87.5° F. The valve 53 is an ordinary valve controlling the supply of liquid carbon dioxide to the receiver 54. The liquid then flows to the liquid cooler 57 through pipe 55 and pressure reducing valve 56. The pressure reducing valve which is adjustable effects a cooling of the liquid by dropping its pressure. In this case the pressure of the liquid is dropped from twelve hundred to eight hundred pounds per square inch and its temperature reduced from 87.5 to 65° F. The cooled liquid then delivers into the space around the pipes in the liquid cooler 57. The pressure within the cooler is maintained about eight hundred pounds per square inch by means of the pressure control valve 62. In construction this valve is like the pressure reducing valve and operates to permit the escape of liquid and gas above a predetermined pressure so that the pressure within the liquid cooler is maintained at the value for which the valve is set. Any gas or liquid which escapes through valve 62 returns through pipe 36 to mixing cylinder 10. Some of the liquid in the space around the pipes in cylinder 57 is delivered through connection 59 and pressure reducing valve 58 to the cooling pipes therein. The reduction in pressure is accompanied by a reduction in temperature so that the cooled gas and liquid flowing through the pipes serve to cool further the main body of liquid around the pipes. The pipes discharge into pipes 60 and 36. The main body of the liquid is thus cooled externally by contact with the cold pipes through which the colder gas flows which has been made so by expansion and socalled internal cooling. Any of the gas which escapes through pipe 36 to the mixer is of the order of the pressure of the gas in the mixer. The liquid then flows to the liquid cooler 64 through valve 63. This liquid is further cooled by delivering a portion thereof through the connection 66 and pressure reducing valve 65, as described in connection with the liquid cooler 57. The cold gas flowing through the pipes is returned through pipes 67 and 51 to the mixing cylinder 6 at a pressure approximately that within the mixing cylinder. The liquid in the liquid cooler 64 is then at a temperature of approximately −30° F. This cooled liquid then flows through pipe 68 to the discharge nozzle 69 of the snow machine. This snow machine is of the type described in my above mentioned applications in which the liquid is solidified in the form of snow by spraying through the nozzle from its condition of high pressure to approximately atmospheric pressure. If desired, the liquid may be delivered directly into the machine and frozen in a manner also disclosed in my above mentioned copending applications.

The gaseous $CO_2$ delivered to mixing cylinder 2 flows through pipe 3 to the compressor 4 where it is compressed to approximately one hundred pounds per square inch and a temperature of approximately 250° F. adiabatically produced. The compressed and heated gas is then cooled as it flows through the intercooler 5 to the mixer 6. From the mixer 6 it flows through pipe 7 to compressor 8 where it attains a pressure of four hundred pounds per square inch and a temperature adiabatically produced of approximately 230° F. The compressed and heated gas then flows through intercooler 9 where it is again cooled and then delivered to mixer 10. In each the gas after leaving the intercooler mixes with the colder gas coming from the liquid coolers. Thus the gas in mixer 6 mixes with and is further cooled by the colder gas coming from liquid cooler 39 and liquid cooler 64. The gas is then delivered through pipe 11 to compressor 12 where its pressure is raised to approximately ten hundred and fifty pounds per square inch and a temperature of 160° F. The compressed gas is then delivered to the water cooled separator 14. Here it is cooled sufficiently so that any moisture therein is condensed and may be removed by a suitable blow-off valve. Likewise, the gas may be purged of any oil as it flows through the oil filters. The gas is then further cooled in the condensers 21 and 25 by flowing over the cooling coils or pipes therein.

The liquid is then delivered from condenser 25 to the liquid receiver 29 from which it flows to liquid cooler 31 through pressure reducing valve 30. In flowing through this valve its pressure is dropped from ten hundred and fifty pounds per square inch to eight hundred pounds per square inch and a corresponding temperature of 65° F. is attained. The liquid is further cooled by evaporation of a portion of the liquid flowing through pipe 33 and pressure reducing valve 32. The gas produced by this pressure reduction which flows through the cooling coils, or pipe, is delivered through pipes 37 and 36 to the mixer 10. Any gas formed in the cooler 31 in the space around the pipes and in excess of the pressure over which the valve 35 is set flows through pipe 34 to pipe 36 and thence to the mixer 10. The liquid then flows to the liquid cooler 39 where it is further cooled by evaporation of a portion thereof which flows through pipe 41 and pressure reducing valve 40. As before, the gas formed by this operation is delivered through pipes 50 and 51 to the mixing cylinder 6. The cooled liquid in the liquid cooler 39 is then delivered through pipes 42 and 46 to the nozzle 48 of the snow machines. The gas formed in the snow machine is delivered through pipe 70 to the space around the cooling coils, or pipes, in the heat exchanger 45. It then flows through pipe 47 to the mixing cylinder 2 where it mixes with and cools the fresh incoming gas. The pipes within the heat exchanger conduct liquid from pipe 46 through pipe 73 and delivers it back through pipe 72 to pipe 46. The contact of the warmer liquid with the cooler pipes acts to reduce the temperature of the liquid before it is delivered to the snow machine.

This completes the double cycle as shown in the diagram. It will be obvious that it may even be arranged in multiple cycles or in a single cycle.

The percentage of vapor obtained in the process when first cooling by pressure drop and subsequently by sub-cooling through a metallic wall is as follows:

When liquid $CO_2$ is cooled from a temperature of 87.5 degrees to 65 degrees by dropping the pressure it requires twenty-two percent of the total weight of the liquid to reduce its own temperature to the lower point. Again, if the liquid is cooled from 80 degrees to 65 degrees the amount of liquid weight spent in cooling the liquid is reduced to seventeen percent. This proportion is maintained in either case, that is, by internal partial evaporation as well as by cooling through a metallic wall and expansion or evaporation of liquid $CO_2$ in a cooling coil or other cooling surface. In sub-cooling the liquid from 65 degrees to 17 degrees, twenty-eight percent of the remaining liquid is spent and by further cooling to —30 degrees, eighteen percent of the remaining liquid is evaporated. In either case the spent vapors are returned to their respective mixers at a pressure value corresponding with that which obtains therein.

When the sub-cooled liquid reaches the solidifying apparatus, commonly called a snow machine, at a temperature of —30 degrees, it will again evaporate 12.8 percent of its weight to reduce its temperature to —70 degrees which is the point of solidification, or its triple point, as the physicists have termed it.

When the liquid changes into a solid, a further loss in weight occurs which is demanded by the heat of fusion and since this heat is stated to be 78.8 B. t. u. per pound, while the total heat of sublimation is slightly over 253 B. t. u. according to the present conception of the properties of $CO_2$, it will be apparent that thirty-two percent of the liquid weight will change into vapor while the balance solidifies.

It will be seen that by this system in method of procedure I have provided an arrangement in which solid carbon dioxide may be made simultaneously from a liquid and gas supply under conditions of operation which makes the procedure of considerable commercial value from the viewpoint of efficiency and heat economy. I am, of course, well aware that many changes in the details of construction and arrangement of the apparatus will occur to those skilled in the art and many variations in the mode of procedure will suggest themselves as well as in the pressures and temperatures suggested in the illustrative example described in detail. I do not, therefore, desire to be strictly limited to this disclosure as given for purposes of description but rather to the field of invention and the scope of the appended claims.

What I seek to secure by United States Letters Patent is:

1. In the method of producing solid carbon dioxide from liquid carbon dioxide derived from sources of different pressure, comprising the steps of dropping the pressure on the liquid from the higher pressure source to substantially the same pressure as the liquid from the lower pressure liquid source, and simultaneously projecting the two liquids into a condition of reduced pressure within the same space to effect solidification of a portion thereof.

2. In the method of simultaneously producing solid carbon dioxide from gaseous and liquid carbon dioxide sources comprising subjecting the gaseous carbon dioxide to liquefying temperature and pressure, simultaneously projecting the liquid carbon dioxide from the two sources into the same chamber at a condition of low pressure to produce solid and gaseous carbon dioxide, cooling the liquid carbon dioxide before the solidification operation by heat exchange with the cooler gas produced during the solidification of other liquid and then mixing the gas with warmer gas from the gas source to cool it.

3. A method of producing solid carbon dioxide from gaseous and liquid carbon dioxide sources, comprising the steps of cooling the liquid carbon dioxide by pressure drop in several stages with the production of cold carbon dioxide gas, producing liquid carbon dioxide from gaseous carbon dioxide in several stages of compression, cooling the compressed gas after each stage by admixture with the colder gas produced during the pressure drop cooling of the liquid and simultaneously producing solid carbon dioxide from both of the liquids so prepared in the same chamber.

4. A method of producing solid carbon dioxide from gaseous and liquid carbon dioxide sources, comprising the steps of cooling the liquid carbon dioxide by pressure drop in several stages with the production of cold carbon dioxide gas, subcooling the liquid in each stage by heat exchange with the colder gas produced by pressure drop in that stage, producing liquid carbon dioxide from gaseous carbon dioxide in several stages of compression, cooling the compressed gas after each stage by admixture with the colder gas produced during the pressure drop cooling of the liquid, and simultaneously producing solid carbon dioxide from both of the liquids so prepared in the same chamber.

5. A method of producing solid carbon dioxide from gaseous and liquid carbon dioxide sources, comprising the steps of cooling the liquid carbon dioxide by pressure drop in several stages with the production of cold carbon dioxide gas, producing liquid carbon dioxide from gaseous carbon dioxide in several stages of compression, cooling the compressed gas after each stage of admixture with the colder gas produced during the pressure drop cooling of the liquid, simultaneously producing in the same chamber solid carbon dioxide from both of the liquids so prepared and initially cooling the incoming carbon dioxide gas before its first compression by admixture with the colder gas produced during the solidification operation.

6. A method of producing solid carbon dioxide from gaseous and liquid carbon dioxide sources, comprising the steps of cooling the liquid carbon dioxide by pressure drop in several stages with the production of cold carbon dioxide gas, producing liquid carbon dioxide from gaseous carbon dioxide in several stages of compression, cooling the compressed gas after each stage by admixture with the colder gas produced during the pressure drop cooling of the liquid, simultaneously producing solid carbon dioxide from both of the liquids so prepared in the same chamber, subcooling the liquid produced by successive compressions by heat exchange with the colder gas produced during the solidification operation and initially cooling the incoming carbon dioxide gas before its first compression by admixture with the gas produced during the solidification operation after its use for heat exchange.

7. The method of simultaneously producing solid carbon dioxide from two sources of carbon dioxide which comprises the steps of delivering gaseous carbon dioxide from a source, compressing the gas in several stages of compression, cooling the compressed gas after each compression, cooling the gas after the last compression to liquefy it, sub-cooling the liquid by discharging it to a lower condition of pressure and forming some gas and circulating that gas in heat exchange relation with the remaining liquid, delivering other liquid carbon dioxide from a source, sub-cooling that liquid by pressure drop and simultaneously discharging both liquids to a condition of low pressure in the same chamber to solidify a portion thereof.

8. In the method of claim 7, the step of delivering the gas formed during the steps of pressure reduction to the gas being compressed for admixture therewith and compression.

9. The method of simultaneously producing solid carbon dioxide from two sources comprising the steps of compressing gaseous carbon dioxide, cooling the compressed gas to liquefy it, delivering carbon dioxide liquid from a liquid source, cooling the liquid so delivered, and simultaneously discharging the two liquids into the same chamber to solidify a portion of each.

In testimony whereof I have hereunto set my hand on this 23rd day of May A. D., 1929.

JUSTUS C. GOOSMANN.